June 6, 1961

C. F. MATHESON 2,987,248

FLIGHT PROGRESS COMPUTER

Filed May 26, 1959

INVENTOR.
CHARLES F. MATHESON
BY
George H. Baldwin
ATTORNEY

June 6, 1961 C. F. MATHESON 2,987,248
FLIGHT PROGRESS COMPUTER
Filed May 26, 1959 2 Sheets-Sheet 2

INVENTOR.
CHARLES F MATHESON
BY
George H. Baldwin
ATTORNEY

United States Patent Office 2,987,248
Patented June 6, 1961

2,987,248
FLIGHT PROGRESS COMPUTER
Charles F. Matheson, 905 Poinciana Lane,
Winter Park, Fla.
Filed May 26, 1959, Ser. No. 815,874
7 Claims. (Cl. 235—61)

This invention relates to a computer and more particularly to a computer suitable for in flight use by aircraft pilots, navigators and the like in ascertaining such flight progress variables as speed, distance and travel time.

It is a general object to provide an improved computer specially suited for use in making flight computations.

It is an object of the invention to provide a computer using linear rather than logarithmic time and distance scales which may be employed for expeditiously solving aircraft time-rate-distance problems.

A particular object is to provide a durable computer which is simple in design, inexpensive to construct and which will indicate travel time in terms of clock time and thereby avoid the necessity for separate computations for converting an ascertained travel time into clock time.

Another object is to provide a computing device of the indicated character which incorporates means for preventing the inadvertent movement of one of the movable elements of the device when other movable elements are being adjusted in position.

Another object is to provide a computing or calculating device for air travel personnel in which from estimated ground speed and known distances between determinable check points, one may compute the estimated clock time over the next check point and when over the check point easily correct for errors in the original estimates, the device being quickly and easily set, readily readjusted, easy to read, accurate in results, compact, operative with one hand, and meeting other requirements of practical use by pilots or navigators.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figures 1, 2:
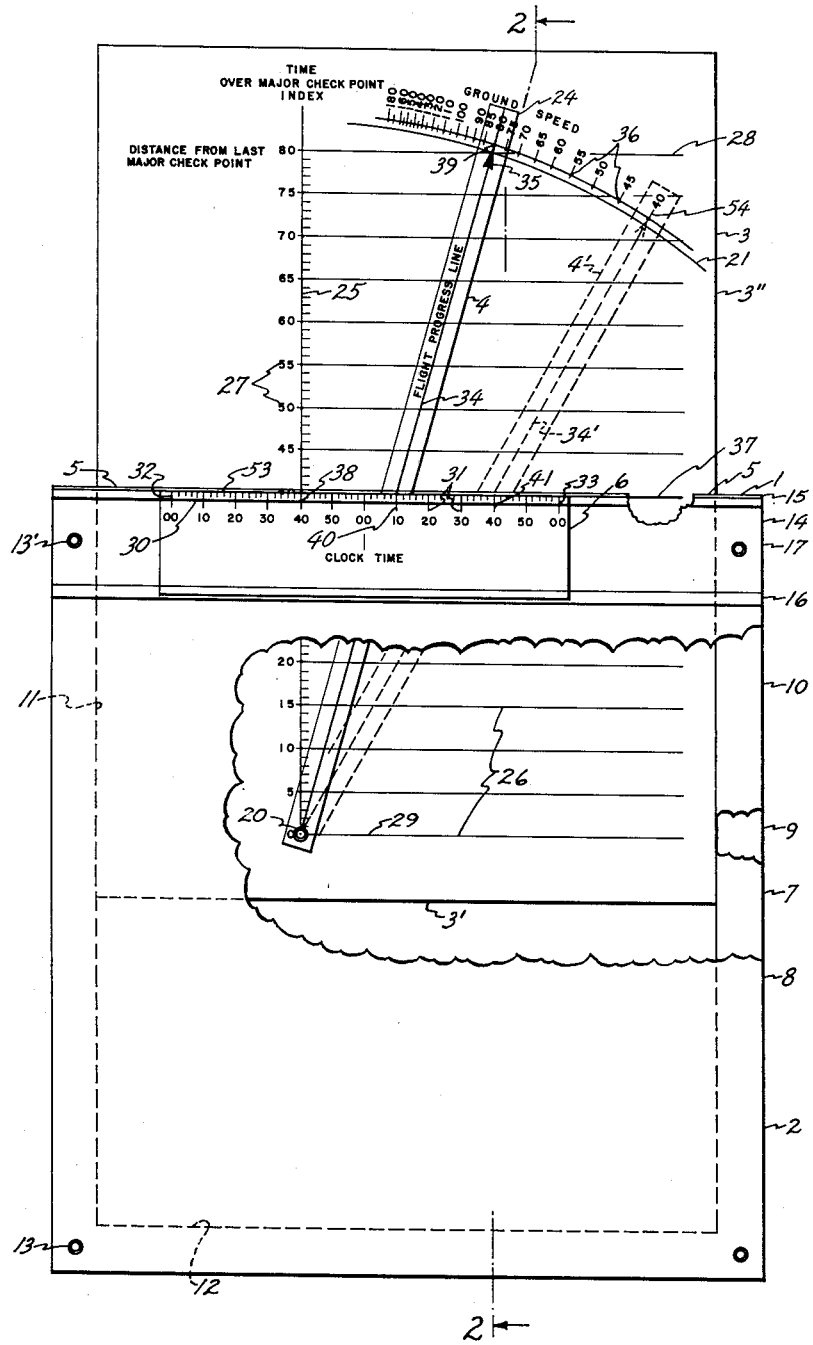
FIG. 1 is a front elevational view of a flight progress computer embodying the concepts of the invention, certain parts being broken away to promote clarity.
FIG. 2 is a sectional view taken along the lines 2—2 of FIG. 1.

With reference to FIG. 1, the flight progress computer is designated therein as 1 and is structurally composed of a flat sheath-like envelope 2 which is open at its upper end 5 and which slidably receives through its end 5 a snugly fitting flat plate member 3. The computer 1 also includes a transparent and preferably relatively rigid arm 4 which is pivotally attached to the plate member adjacent an end 3' thereof. Slidably attached to the envelope along end 5 thereof is a flat card element 6, which, it will be seen, is transversely adjustable for making computations with the calculating device and which preferably has an overlapping edge which is adapted to indexingly register with certain calibrations on the plate member 3.

The envelope or sheath 2 is composed of a spacer 7 interposed between front and back panels 8 and 9, respectively, the spacer including side arms 10 and 11 integrally formed with and extending upwardly from an interconnecting base portion 12. The panels 8 and 9 and the arms 10 and 11 define the open top 5 of the envelope 2 through which lower end 3' of the plate member enters and from which the upper end portion 3'' of plate member 3 extends when positioned for use. Front and rear panels 8 and 9 are suitably attached to one another by means of fastening eyelets 13 and 13' extending through spacer 7 and locking the envelope into a unitary structure. The U-shaped spacer member 7 may be composed of any suitable durable material which is preferably light in weight. Panels 8 and 9 may be composed of any suitable material, preference being had for flexible lightweight materials which have a slight tendency to bind the plate member and to hold the member in position when partially withdrawn from the sheath 2, such as in the position of FIGS. 1 and 2.

As previously mentioned, clock time indexing card 6 is slidably mounted on the envelope 2 at end 5. For this purpose a card caging member 14 is provided and secured to the envelope 2 along its upper edge. The caging member 14 is provided with overturned, or curled over, track edge portions 15 and 16 which extend around the card edges to retain the card along the end 5 of the envelope and to serve as tracks along which card 6 may be manually manipulated to slide between the opposite ends of the card caging member and accordingly between the opposite side edges of envelope 2.

As best shown in FIG. 2, the eyelets, such as eyelet 13', secure member 14 to envelope 2. These eyelets project through and outwardly from the flat body portion 17 of card caging member 14 and function as card retaining stops which prevent the card 6 from passing through the open ends of the tracks 15 and 16.

As best illustrated in FIG. 2, the plate member 3 is composed of a flat elongated and preferably rigid sheet 18 which is protected by a stiff transparent cover 19, of celluloid, cellulose acetate, or other suitable plastic sheet material, or the like. Cover 19 overlies both the front and back faces of sheet 18 and extends over the top edge thereof. The cover 19 has front and back panels 22 and 23, respectively, which protect the sheet from wear and tear during use. A major portion of the elongated arm 4 is also protected by cover 19 as shown in FIG. 1, the arm at its lower end being pivotally mounted on the lower end of sheet 18 spacedly inwardly of the side edges of the sheet by pivot pin 20. Pin 20 also serves as an attaching element which secures the transparent cover 19 to sheet 18 by passing through both the front and back panels of the cover 19 as well as the intervening sheet 18 and arm 4. The upper end of the front panel of cover 19 is provided with an arcuate slot 21 and the elongated transparent arm 4 extends upwardly from its pivot 20 throughout a major portion of its length between front panel 22 and sheet 18 and thereabove and at its upper end 24 extends outwardly through slot 21 to overlie cover panel 22. The upper end 24 of the arm 4 may be engaged manually and the arm caused to pivot throughout the range permitted by the extent of slot 21. Because of its relative rigidity and its overlying relationship to transparent panel 22 at its upper end 24, arm 4 tends to be held out from the face of sheet 18 above pivot 20 thereby tending to cause a bulge in the front panel 22 of cover 19. This causes the sheath to frictionally bind the plate member 3, especially adjacent the upper end 5 of the sheath, and aids in holding the plate member 3 in selected adjusted positions within the sheath.

Referring again to FIG. 1, it will be seen that sheet 18 has certain markings thereon and that card 6 also has certain indicia printed thereon. Extending vertically from pivot 20 is a time index line 25 which is printed on sheet 18 spacedly inwardly of the side edges thereof. As will be shown subsequently, the time index line 25 is employed in the use of the calculator computer 1 for cooperating with certain clock time index scale markings on card 6.

Sheet 18 also has a plurality of transversely extending and equally spaced lines 26 which are printed thereon. These scale lines 26 intersect the time index line 25 and form a longitudinally extending lineal distance scale. Lines 26 serve to indicate distances and are numbered in the illustrated embodiment by numerals 27 which progressively increase in numbered units of five from the lowermost line 29 which is labeled 0 to uppermost line 28 which is labeled 80. The top edge of card 6 preferably extends slightly over the top edge of panel 20 and forms an index for readings associated with scale 26, the edge of the card being arranged to selectively register with the respective scale lines 26 in accord with the relative position of plate member 3 in sheath 2.

Card 6 which hereafter will usually be referred to as the clock time index card has a plurality of vertically extending and equally spaced markings 30 along its upper edge constituting a transversely extending lineal clock time scale that cooperates with the time index line 25 on sheet 18. The clock time scale 30 in the illustrative embodiment covers a time period of two nondesignated clock hours and, as shown in FIG. 1, is broken down into calibrated designated units 31 of 10 minutes which extend from 00 for line 32 at the left of the card and which indicates a clock time for the beginning of a first hourly period to be determined upon use by the user of the computer, to 00 for line 33 which indicates the end of the second hourly period on the scale 30.

It will be noted in FIG. 1 that a straight line 34 to be referred to hereinafter as the flight progress line is printed on transparent elongated arm 4 and extends from pivot 20 at the intersection of line 29 with the time index line to an arrow 35 at the upper end 24 of arm 4. Arrow 35 points to a ground speed scale 36 printed on sheet 18 adjacent slot 21.

The radially extending markings 36 which form the ground speed scale are printed on sheet 18 spacedly along an arc having its center of curvature at the pivot point of arm 4. The markings 36 are calibrated to show the quotient of the distance in miles, as read on distance scale 26 along the top indexing edge 53 of the clock time index card 6, divided by the equivalent hourly time interval corresponding to the minutes interval read on the clock time scale 30 between the intersections of the time index line 25 and the flight progress line 34 with the top edge index of the clock time index card 6. To illustrate, as shown in FIG. 1, plate 3 is in a partially withdrawn position in envelope 2 and the top edge of card 6 which functions as an index line indicates in the position shown a distance corresponding to 40 miles on the distance scale 26. The time interval as read on clock time scale 30 between the intersections of time index line 25 and flight progress line 34 with the indexing top edge of card 6 corresponds to a period of 30 minutes or an equivalent one-half hourly period starting 40 minutes past an hour and ending at 10 minutes past the next hour. The quotient of these figures is 80 miles per hour which corresponds to the speed indicated by arrow 35 on ground speed scale 36 where the flight progress line registers with mark 39.

A particularly advantageous feature of the computer lies in the provision of a time scale which enables computations based on actual clock times as opposed to differences in clock time, thus avoiding on the part of the user of the device the necessity for separately converting a time unit period into actual clock time which conversion is time consuming and tends to increase the possibility of error.

The operational and functional aspects of the computer insofar as use of the scales on the front face thereof are concerned are best illustrated by a practical example wherein it may be assumed that a pilot of an airplane is progressing between distant points and is periodically checking his flight progress by calculations which involve known distances between determinable check points such as visually observable check points. First, assume that the plane is passing over check point A at the known time of 1:40 p.m. and it is desired to know the estimated time of arrival at check point B, a distance of 40 miles from check point A. To accomplish this computation, the plate 3 is withdrawn from its sheath 2 until the distance index line formed by the top edge 53 of card 6 registers with the line 37 which corresponds to a distance reading of 40 miles on the distance scale 26. Since the plane is passing over the check point at 1:40 p.m., the clock time index card 6 is slidably adjusted in its mounting member 14 so that the 40 marking, indicated at 38 on the clock time scale 30, registers with time index line 25. Assuming that the pilot knows his approximate ground speed from a previous check to be 80 miles per hour, the pilot then adjusts the arm 4 so that arrow 35 points to the 80 m.p.h. ground speed marking 39 and reads from time scale 30 the estimated clock time for arrival at check point B. This reading is indicated by the flight progress line 34 at its intersection with the upper edge 53 of the clock time index card 6. Since the flight progress line intersects the edge of the card 6 at 40 of scale 30 which indicates 10 minutes past the beginning of the second hourly portion of scale 30, he then knows that he should arrive over check point B at an estimated time of 2:10 p.m.

To further illustrate the use of the computer and to continue with the example, it may be assumed that the plane arrives at check point B at 2:40 p.m. instead of 2:10 p.m. as might happen if the plane were to encounter heavy head winds while traversing the distance between check points A and B. Under these circumstances it is desired to know the actual ground speed accomplished between points A and B to enable a reasonably accurate estimate of ground speed between point B and the next check point along the route of travel. Under these circumstances the pilot can backcheck and determine his actual ground speed between points A and B by first relatively positioning the index card 6, the envelope 2 and the plate 3 in accord with their relative positions illustrated in the prior computation. Thereafter by swinging the arm 4 to the position shown by the broken line position of the curve at 41 in FIG. 1 and at which position the flight progress line shown in broken lines at 34' intersects the upper edge of card 6 at mark 41 which corresponds to 40 minutes past the second hour or 2:40 p.m. in the example, the actual ground speed between check points A and B is indicated by the arrow of flight progress line 34' where the index line 34' registers with mark 54 on scale 36 which indicates a speed of 40 m.p.h.

Figure 3:
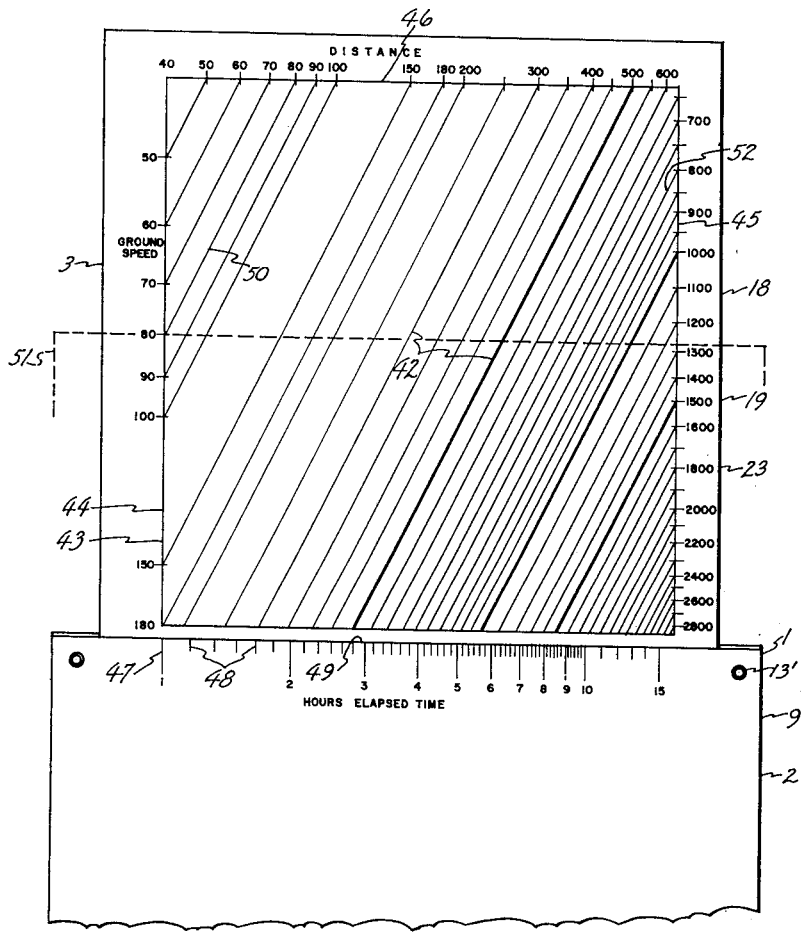
FIG. 3 is a rear view of the computer shown in FIG. 1, the inner plate member thereof being shown therein as being further extended than in FIG. 1.

The back of the computer is shown in FIG. 3. Printed on the back surface of sheet 18 and viewable through the transparent back panel 23 of cover 19 are a plurality of spaced parallel slanting lines 42 which are confined within a rectangle 43 which is also printed thereon. As will be noted along the opposite side lines 44 and 45 and along the top line 46 of the rectangle 43, each of the lines is assigned a numerical value, the value for the respective lines being progressively larger in a downward direction which is normal to the direction in which the lines are slanted. Left side line 44 serves as a base line along which that portion of the lines 42 which are intersected thereby are indexed in terms of speed, and all of the lines may be interpreted in terms of distance by readings along top line 46 or right side line 45 of rectangle 43.

Horizontally spaced vertically extending lines 48 forms another scale 47 which is printed on the back panel 9 of envelope 2. This scale 47 is indexed with the lines 42 and cooperates along the top indexing edge 49 of panel 9 with the slanted lines 42 on sheet 18 to enable one to compute distances between points, ground speed or an elapsed time period of travel between the points when knowledge of any two of the functions is available. For example, to compute the travel time at an estimated ground speed of 80 m.p.h. between points D and E which are known to be 800 miles apart, the plate member 3 is slid into envelope 2 from the position shown in FIG. 3 until the top edge 49 of envelope panel 9 intersects the 80 line, designated at 50, of the slanting lines 42 at the base line 44. This is illustrated by the broken line position 51 of envelope 2 in FIG. 3. Thereafter the elapsed hourly time period for traversing the distance of 800 miles may be read directly from scale 47 by reading the value thereon which exists at the intersection of the 800 line, designated at 52, and the top edge 49 of panel 9. It will be apparent from this illustrative example that any one of the three functions of speed, distance or time may be ascertained with knowledge of the other two functions by a similar manipulation of the device.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a computer, a flat sheath having an end opening, a flat elongated plate member having one end portion disposed within said sheath and an opposite end portion extending outwardly thereof through said opening, said plate member including a sheet and a transparent panel having a slot therein adjacent said opposite end portion and covering the front of said sheet, said panel having an outer face in frictional engagement with the interior of said sheath, an arm disposed between said panel and said sheet pivotally connected to said plate member at said one end portion and extending outwardly through said slot in said panel at said opposite end portion of said plate member.

2. In a computer comprising a flat sheath having an open end, a flat elongated plate member having one end portion disposed within said sheath and an opposite end portion extending outwardly thereof through said open end, said plate member including a scale imprinted sheet and a protective transparent cover for the front face of said sheet, said cover being in frictional engagement with the interior of said sheath, an elongated arm having one end pivotally connected to said one end portion of said plate member and having an opposite end, said arm being disposed between said cover and said sheet throughout a major portion of the length of said arm and extending outwardly through said cover at said opposite end portion and having its said opposite end in manually accessible position overlying said front panel at said opposite end portion.

3. A computer comprising an envelope having an open end and scale markings adjacent said open end, a sheet having opposite end portions and a scaled face, said sheet being slideable inwardly through said open end of said envelope when one of said end portions is introduced thereinto through said open end, said scaled face of said sheet being adjacent said scale markings on said envelope when said sheet is introduced thereinto, a transparent panel attached to and covering said scaled face of said sheet, said panel having a slot adjacent to the other of said end portions of said sheet, an index-carrying arm pivotally connected to said one end portion of said sheet, said arm being disposed between said panel and said sheet and having a manually manipulatable end extending through said slot overlying said panel, said panel being in frictional contact with said envelope internally of said envelope.

4. A computer comprising a flat sheath having an open end, a manually movable member having a scale therealong, means slidably mounting said member externally on said sheath at and slideable along said open end thereof, a flat elongated plate member longitudinally slideable in and out of said sheath and having a longitudinally extending lineal scale, an arcuate scale at one end of said plate member and a longitudinally extending index line passing through the center of curvature of said arcuate scale at the other end of said plate member, said center constituting the zero point of said lineal scale on said index line and an arm pivotally connected to said plate member at said zero point manually swingable to sweep across said arcuate scale, said arm having an elongated marking therealong indexing with said arcuate scale and with said scale of said movable member, said movable member including index means cooperating with said longitudinally extending lineal scale for indicating readings thereon.

5. A flight computer comprising a flat sheath having an opening at one end, a manually movable member having a scale therealong, means mounting said member externally on said sheath at and slideable along said open end thereof, a flat elongated plate member having a longitudinally extending scale, an arcuate scale at one end of said plate member with a center of curvature at the other end of said plate member, and a longitudinally extending index line passing through said center of curvature for indicating base readings on said first mentioned scale, said plate member being longitudinally slideable in and out of said sheath and an elongated arm pivotally connected at said center of curvature to said plate member and manually movable to sweep said arcuate scale, said arm having an index cooperating with said arcuate scale and with said transversely extending lineal scale, said movable member including index means cooperating with said longitudinally extending lineal scale.

6. A flight computer comprising: a flat sheath including respective front and back panels and a U-shaped frame member interposed between said panels having upstanding legs defining an opening into said sheath between the ends of said legs and between said panels, a manually movable member having a clock time scale therealong, slide means mounting said member on said front panel at and slideable along said opening, a flat elongated sheet member longitudinally slideable in and out of said sheath through said opening, said sheet having imprinted on the front face thereof a longitudinally extending lineal scale for indicating distance, an arcuate scale calibrated to indicate speed and having a center of curvature at the other end of said sheet member, and a longitudinally extending index line extending to said center of curvature for indicating base readings on said time scale, an elongated arm pivotally connected to said sheet member at said center of curvature and manually movable to sweep said speed scale, said arm having an index line extending between said pivotal connection and said speed scale cooperating with said speed scale and with said time scale to indicate readings on said scales, and a transparent cover overlying said face of said sheet member and a portion of said arm, said cover having a slot disposed adjacent said speed scale through which a manually accessible sweep end portion of said arm extends.

7. A computer comprising a flat envelope having opposite faces and an upper edge defining an opening thereinto, an elongated rigid sheet member having opposite faces and being slideably disposed within said envelope, said sheet member having an end portion extending above said opening manually accessible for manipulating said member slideably in and out of said envelope, a transparent cover attached to said sheet member and comprising respective panels overlying said opposite faces thereof, one of said panels overlying one of said faces and being slotted at said end portion of said sheet member, an elongated arm pivotally connected to an opposite end portion of and overlying said one face of said sheet member and being disposed between said one face and said one panel, said arm having a manually engageable swinging end portion extending outwardly through the slot of said one panel, a longitudinally extending index line and a first scale imprinted on said one face of said sheet member, a card transversely slideably attached to said envelope on the face thereof which covers said one face of said sheet at the upper edge of said envelope said card having an upper edge adapted and arranged to index with said first scale, a second scale imprinted along said upper edge of said card indexed by said index line, an arcuate third scale imprinted on said one face of said sheet member adjacent the sweep end of said overlying arm, indexing means imprinted on said arm for cooperatively indexing said third scale and said second scale, a fourth scale imprinted on the other of said faces of said envelope and adjacent said upper edge thereof adapted and arranged to cooperate with said upper edge.

References Cited in the file of this patent

UNITED STATES PATENTS

| | | |
|---|---|---|
| 280,772 | Tucker | July 3, 1883 |
| 1,074,439 | Kincaid | Sept. 30, 1913 |
| 1,200,569 | Young | Oct. 10, 1916 |
| 2,667,305 | Jones et al. | Jan. 26, 1954 |